United States Patent
Ando et al.

(10) Patent No.: US 11,703,002 B2
(45) Date of Patent: Jul. 18, 2023

(54) EGR ESTIMATION METHOD FOR INTERNAL COMBUSTION ENGINE AND EGR ESTIMATION DEVICE FOR INTERNAL COMBUSTION ENGINE

(71) Applicant: NISSAN MOTOR CO., LTD., Yokohama (JP)

(72) Inventors: Taichi Ando, Kanagawa (JP); Kenji Suzuki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/915,657

(22) PCT Filed: Apr. 2, 2020

(86) PCT No.: PCT/JP2020/015232
§ 371 (c)(1),
(2) Date: Sep. 29, 2022

(87) PCT Pub. No.: WO2021/199412
PCT Pub. Date: Oct. 7, 2021

(65) Prior Publication Data
US 2023/0113431 A1      Apr. 13, 2023

(51) Int. Cl.
*F02D 41/00* (2006.01)
*F02M 26/06* (2016.01)
(Continued)

(52) U.S. Cl.
CPC ......... *F02D 41/0072* (2013.01); *F02M 26/06* (2016.02); *F02M 26/21* (2016.02); *F02B 37/16* (2013.01)

(58) Field of Classification Search
CPC ........ F02M 26/00; F02M 26/05; F02M 26/06; F02M 26/07; F02M 26/01; F02D 41/006
See application file for complete search history.

(56) References Cited

U.S. PATENT DOCUMENTS

2014/0130783 A1    5/2014  Takaki
2015/0007564 A1*   1/2015  Yoshioka ............ F02D 41/0062
                                                  60/605.2
(Continued)

FOREIGN PATENT DOCUMENTS

| JP | 2013-007268 A | 1/2013 |
| JP | 2016-217249 A | 12/2016 |
| WO | WO-2012/176490 A1 | 12/2012 |

*Primary Examiner* — John Kwon
(74) *Attorney, Agent, or Firm* — Foley & Lardner LLP

(57) ABSTRACT

An EGR estimation method for estimating an EGR rate in an intake and exhaust system of an internal combustion engine, the intake and exhaust system including: an intake system including an air cleaner and an intake passage that connects the air cleaner and the engine, an exhaust system including an exhaust passage, and a supercharger that is provided in the intake passage and the exhaust passage, the intake and exhaust system including an EGR device including an EGR passage that connects the intake passage and the exhaust passage and an EGR valve, and the intake system including an intake bypass passage that connects an upstream pressure portion and a downstream pressure portion of the supercharger and a recirculation valve. The EGR estimation method includes: opening the recirculation valve during supercharging, and estimating the EGR rate after closing the EGR valve based on the EGR rate before opening the recirculation valve.

7 Claims, 5 Drawing Sheets

(51) Int. Cl.
*F02M 26/21* (2016.01)
*F02B 37/16* (2006.01)

(56) References Cited

U.S. PATENT DOCUMENTS

| | | | |
|---|---|---|---|
| 2015/0075162 A1* | 3/2015 | Yoshioka | F02M 26/15 60/605.2 |
| 2017/0082044 A1* | 3/2017 | Takaki | F02D 41/0052 |
| 2018/0128192 A1* | 5/2018 | Sugiyama | F02D 9/02 |

* cited by examiner

EGR ESTIMATION METHOD FOR INTERNAL COMBUSTION ENGINE AND EGR ESTIMATION DEVICE FOR INTERNAL COMBUSTION ENGINE

TECHNICAL FIELD

The present invention relates to EGR estimation of an internal combustion engine.

BACKGROUND ART

JP2013-7268A and WO2012/176490A1 disclose an intake device of an internal combustion engine with a supercharger that prevents fresh air containing EGR gas from being blown back to an air flow meter when a recirculation valve is opened. The recirculation valve releases a pressure downstream of a compressor to upstream of the compressor when a throttle valve is closed.

SUMMARY OF INVENTION

When the recirculation valve is opened during supercharging, gas may flow back to the vicinity of an air cleaner. Therefore, in this case, it is conceivable to fully close an EGR valve so that the EGR gas does not flow back. However, even if EGR is stopped in this way, the EGR gas already existing in an intake passage flows back in the intake passage and then flows into a cylinder of the internal combustion engine. Therefore, it is desired to understand how the backflow EGR gas flows into the cylinder and estimate a more accurate EGR rate.

The present invention is made in view of such a problem, and an object of the present invention is to estimate a more accurate EGR rate when the recirculation valve is opened and the EGR valve is fully closed during supercharging.

An EGR estimation method for an internal combustion engine according to one embodiment of the present invention is the EGR estimation method for the internal combustion engine that estimates an EGR rate in an intake and exhaust system of an internal combustion engine, the intake and exhaust system of an internal combustion engine including: an intake system including an air cleaner and an intake passage that connects the air cleaner and an internal combustion engine, an exhaust system including an exhaust passage that is connected to the internal combustion engine, and a supercharger that is provided in the intake passage and the exhaust passage, the intake and exhaust system being provided with an EGR device including an EGR passage that connects the intake passage and the exhaust passage and an EGR valve that is provided in the EGR passage, and the intake system including an intake bypass passage that connects an upstream pressure portion and a downstream pressure portion of the supercharger in the intake system and a recirculation valve that is provided in the intake bypass passage, the EGR estimation method includes estimating the EGR rate based on EGR gas flowing back to the air cleaner side by opening the recirculation valve during supercharging.

According to other embodiment of our invention, an EGR estimation device corresponding to the EGR estimation method is provided.

DESCRIPTION OF EMBODIMENTS

Hereinafter, an embodiment of the present invention will be described with reference to the accompanying drawings.

Figure 1:
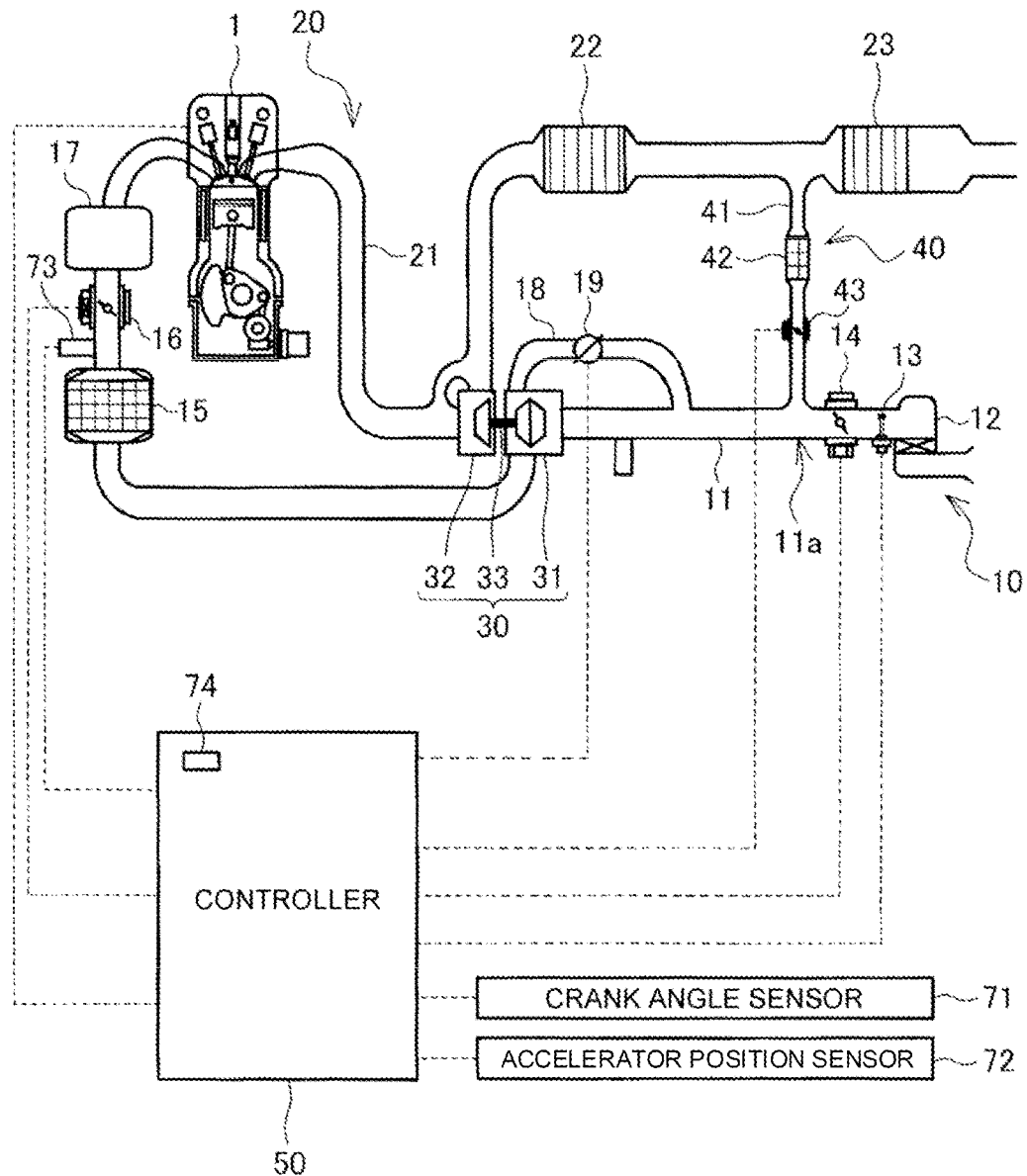
FIG. 1 is a schematic configuration diagram showing a main part of a vehicle.

FIG. 1 is a diagram showing a main part of a vehicle. The vehicle includes an internal combustion engine 1, an intake system 10, an exhaust system 20, a supercharger 30, an EGR device 40, and a controller 50.

The intake system 10 includes an intake passage 11, an air cleaner 12, an air flow meter 13, an intake throttle valve 14, an intercooler 15, a throttle valve 16, a collector 17, a compressor 31, an intake bypass passage 18, and a recirculation valve (hereinafter referred to as R/V) 19. The intake passage 11 connects the air cleaner 12 and the internal combustion engine 1 and circulates intake air introduced into the internal combustion engine 1. The intake passage 11 is provided with the air cleaner 12, the air flow meter 13, the intake throttle valve 14, the compressor 31, the intercooler 15, the throttle valve 16, and the collector 17 in this order from an upstream side.

The air cleaner 12 removes foreign matters contained in the intake air. The air flow meter 13 measures a flow rate of the intake air. The intake throttle valve 14 is provided in a portion of the intake passage 11, which is on an upstream side of an EGR convergence portion 11a to which an EGR passage 41 is connected, which will be described later. The intake throttle valve 14 increases a recirculation amount of exhaust gas through the EGR passage 41 by reducing an opening degree.

The intercooler 15 cools the supercharged intake air. The throttle valve 16 adjusts an amount of the intake air introduced into the internal combustion engine 1. The collector 17 temporarily stores the intake air. The compressor 31 is a compressor of the supercharger 30 and compresses the intake air.

The exhaust system 20 includes an exhaust passage 21, an upstream catalyst 22, a downstream catalyst 23, and a turbine 32. The exhaust passage 21 is connected to the internal combustion engine 1 and circulates exhaust gas discharged from the internal combustion engine 1. The exhaust passage 21 is provided with the turbine 32, the upstream catalyst 22, and the downstream catalyst 23 in this order from an upstream side. The upstream catalyst 22 and the downstream catalyst 23 purify the exhaust gas. The turbine 32 is the turbine of the supercharger 30 and recovers energy from the exhaust gas.

The supercharger 30 compresses the intake air and then supplies to the internal combustion engine 1. The supercharger 30 is a turbocharger and includes the compressor 31, the turbine 32, and a shaft 33. The supercharger 30 is provided in the intake passage 11 and the exhaust passage 21 by providing the compressor 31 in the intake passage 11 and the turbine 32 in the exhaust passage 21. In the supercharger 30, when the turbine 32 is rotated by the exhaust gas, the compressor 31 is rotated via the shaft 33 to compress the intake air. In the compressor 31, a pair of compressor wheels arranged in a back-to-back direction are provided on the shaft 33, and the intake air is compressed by the pair of compressor wheels. The turbine 32 is provided with an exhaust bypass passage, and the exhaust bypass passage is provided with a waste gate valve (not shown) that adjusts a flow rate of the flowing exhaust gas.

The EGR device 40 includes the EGR passage 41, an EGR cooler 42, and an EGR valve 43. The EGR device 40 recirculates the exhaust gas from the exhaust passage 21 to the intake passage 11.

The EGR passage 41 connects the exhaust passage 21 and the intake passage 11. The EGR passage 41 recirculates a part of the exhaust gas flowing through the exhaust passage 21 to the intake passage 11 as EGR gas. The EGR passage 41 is provided with the EGR cooler 42 and the EGR valve 43. The EGR cooler 42 cools the EGR gas flowing through the EGR passage 41. The EGR valve 43 adjusts a flow rate of the EGR gas flowing through the EGR passage 41.

The EGR device 40, specifically, the EGR passage 41 connects a portion downstream of the supercharger 30, that is, the turbine 32 in the exhaust passage 21, and a portion upstream of the supercharger 30, that is, the compressor 31 in the intake passage 11. In this way, the EGR passage 41 connecting the intake passage 11 and the exhaust passage 21 forms an EGR path of a low pressure loop, that is, an LPL. More specifically, the EGR passage 41 connects a portion of the exhaust passage 21 between the upstream catalyst 22 and the downstream catalyst 23 and a portion of the intake passage 11 between the intake throttle valve 14 and the compressor 31.

The intake bypass passage 18 connects an upstream pressure portion and a downstream pressure portion of the supercharger 30 in the intake system 10. The upstream pressure portion is a portion of the intake passage 11 on an upstream side of the supercharger 30 and on a downstream side of the EGR convergence portion 11a. The downstream pressure portion is a portion of the intake passage 11 on a downstream side of the supercharger 30 and on an upstream side of the intercooler 15. Connecting to the downstream pressure portion of the supercharger 30 in the intake system 10 includes connecting to the compressor 31 so that the compressed intake air can flow into the intake bypass passage 18.

The R/V 19 is provided in the intake bypass passage 18. The R/V 19 includes an on-off valve. During supercharging, a downstream pressure of the supercharger 30 is higher than an upstream pressure thereof. Therefore, when the R/V 19 is opened during the supercharging, the intake air compressed by the compressor 31 is returned to the intake passage 11 on the portion upstream of the supercharger 30 via the intake bypass passage 18.

The controller 50 is an electronic control device, and in addition to the air flow meter 13, signals from various sensors and switches such as a crank angle sensor 71, an accelerator position sensor 72, a supercharging pressure sensor 73, and an atmospheric pressure sensor 74 are input to the controller 50. The crank angle sensor 71 generates a crank angle signal for each predetermined crank angle. The crank angle signal is used as a signal representing a rotation speed NE of the internal combustion engine 1. The accelerator position sensor 72 detects an amount of depression of an accelerator pedal of the vehicle. The amount of depression of the accelerator pedal is used as a signal representing a load of the internal combustion engine 1. The supercharging pressure sensor 73 detects the downstream pressure of the supercharger 30 in the intake passage 11, and the atmospheric pressure sensor 74 detects atmospheric pressure.

The controller 50 controls the intake throttle valve 14, the throttle valve 16, the R/V 19, and the EGR valve 43 in addition to the internal combustion engine 1 based on the above input signals from the various sensors and switches. The controller 50 controls the internal combustion engine 1 by controlling an ignition timing and a fuel injection amount according to an engine operating state. The engine operating state is, for example, the rotation speed NE or the load.

When the R/V 19 is opened during the supercharging, gas may flow back to the vicinity of the air cleaner 12. Therefore, in this case, it is conceivable to fully close the EGR valve 43 so that the EGR gas does not flow back. However, even if EGR is stopped in this way, the EGR gas already existing in the intake passage 11 flows back in the intake passage 11 and then flows into a cylinder of the internal combustion engine 1.

Therefore, in the present embodiment, it is understood how the backflow EGR gas flows into the cylinder, and an EGR rate (actual EGR rate) is estimated based on an understood inflow mode.

Figure 2A:
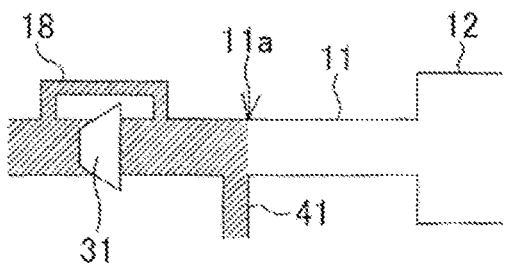
FIG. 2A is a first diagram for explaining a flow mode of EGR gas.

FIGS. 2A to 2D are diagrams for explaining a flow mode of the EGR gas. In FIGS. 2A to 2D, the air flow meter 13, the R/V 19, and the like are not shown. FIG. 2A shows a state immediately before opening the R/V 19 during the supercharging. At this time, the intake passage 11 on a downstream side from the EGR convergence portion 11a is filled with the EGR gas having a target EGR rate consisting of mixed gas with the intake gas.

Figure 2B:
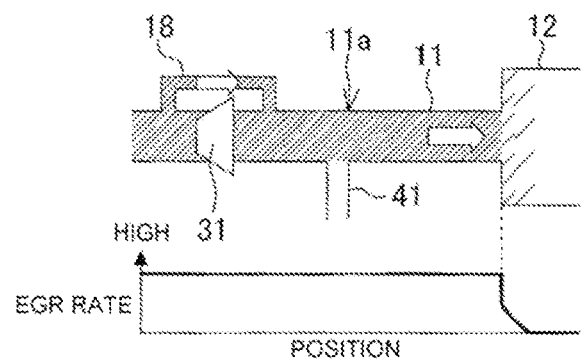
FIG. 2B is a second diagram for explaining the flow mode of the EGR gas.

FIG. 2B shows a state when the R/V 19 is opened and the EGR valve 43 is fully closed during the supercharging. At this time, the mixed gas compressed by the compressor 31 is returned to the intake passage 11 on an upstream side of the compressor 31 via the intake bypass passage 18, and further flows back to the air cleaner side, that is, to an upstream side of the EGR convergence portion 11a, and then blows through the air cleaner 12. In this way, in the air cleaner 12, the mixed gas is diluted with air. As a result, the EGR rate decreases stepwise at an outlet position of the air cleaner 12, and further gradually decreases toward the upstream side.

Figure 2C:
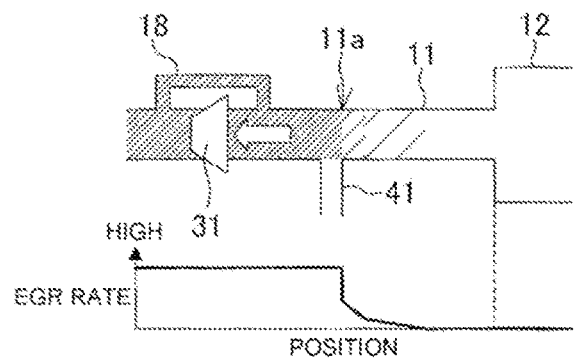
FIG. 2C is a third diagram for explaining the flow mode of the EGR gas.

FIG. 2C shows a state when a flow rate Q2 corresponding to a volume of the intake passage 11 from the EGR convergence portion 11a to a connection portion with the air cleaner 12 (hereinafter referred to as an upstream pipe volume) is re-inhaled. At this time, as a result of the diluted mixed gas reaching immediately before the EGR convergence portion 11a, a step at which the EGR rate decreases stepwise is located immediately before the EGR convergence portion 11a.

Figure 2D:
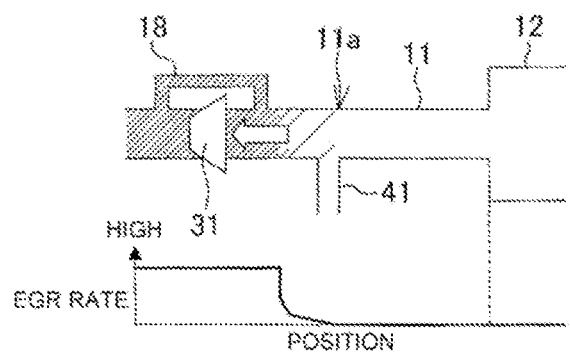
FIG. 2D is a fourth diagram for explaining the flow mode of the EGR gas.

FIG. 2D shows a state in which the diluted mixed gas passes through the EGR convergence portion 11a and then re-inhaled. At this time, in the EGR convergence portion 11a, the EGR rate gradually decreases due to the diluted mixed gas.

In view of such a flow mode of the mixed gas, in the present embodiment, the EGR rate in the EGR convergence portion 11a is estimated based on an amount of the gas flowing back to the air cleaner 12 side (hereinafter referred to as a backflow rate of the EGR gas).

Figure 3:
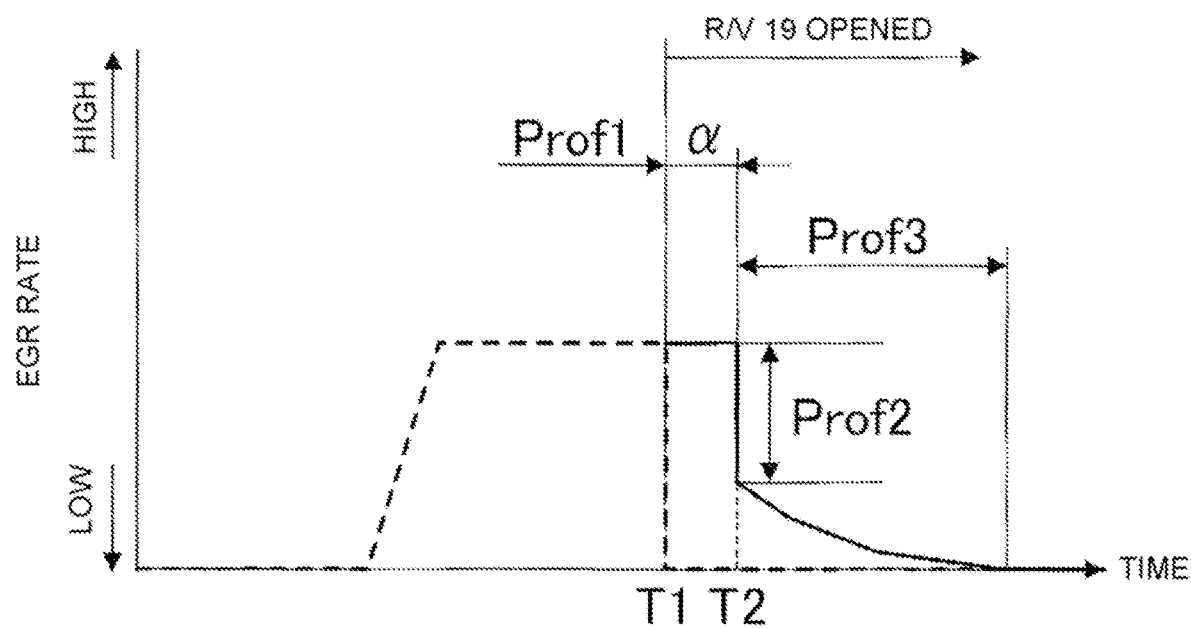
FIG. 3 is an explanatory diagram of a method for estimating an EGR rate.

FIG. 3 is a diagram for explaining a method for estimating the EGR rate. A broken line indicates the target EGR rate.

At a timing T1, the R/V 19 is opened. At this time, the EGR valve 43 is fully closed and the EGR is stopped, but the mixed gas is blown back as described above with reference to FIG. 2B. As a result, the EGR rate in the EGR convergence portion 11a does not become zero indicated by the broken line, but remains unchanged at the timing T1.

At a timing T2, the flow rate Q2 corresponding to the upstream pipe volume is re-inhaled. As described above with reference to FIG. 2C, the EGR rate in the EGR convergence portion 11a remains unchanged until the timing T2 at which the flow rate Q2 corresponding to the upstream pipe volume is re-inhaled.

If the backflow rate of the EGR gas is large, a time until the flow rate Q2 corresponding to the upstream pipe volume is re-inhaled becomes long. Therefore, the timing T2 changes according to the backflow rate of the EGR gas. As a result, a predetermined time a shown as a time between the timing T1 and the timing T2 becomes longer as the backflow rate of the EGR gas increases. The predetermined time a is a time from the R/V 19 is opened until the flow rate Q2 corresponding to the upstream pipe volume is re-inhaled, and is changed according to the backflow rate of the EGR gas.

Therefore, in the present embodiment, from the timing T1 to the timing T2, even if the R/V 19 is opened and the EGR valve 43 is fully closed with the upstream pipe volume as a compliant element, until the predetermined time a elapses, the estimated EGR rate is set by a first profile Prof1 that holds the EGR rate in the EGR convergence portion 11a to the target EGR rate immediately before opening the R/V 19.

As described above with reference to FIGS. 2C and 2D, immediately after the timing T2, the EGR rate in the EGR convergence portion 11a is represented by an EGR rate in the air cleaner 12 when the EGR gas flows back into the air cleaner 12. Therefore, immediately after the timing T2, the EGR rate in the EGR convergence portion 11a is estimated based on the above EGR rate in the air cleaner 12.

Immediately after the timing T2, the EGR rate in the EGR convergence portion 11a decreases stepwise as described above with reference to FIG. 2C. The EGR rate at this time is higher since the larger an amount of the mixed gas blown back to the air cleaner 12, the more difficult it is for the mixed gas to be diluted. The amount of the mixed gas blown back to the air cleaner 12 increases as the backflow rate of the EGR gas increases. Therefore, the EGR rate at this time increases as the backflow rate of the EGR gas increases.

Therefore, in the present embodiment, the estimated EGR rate is set by a second profile Prof2 that decreases the EGR rate stepwise following the first profile Prof1 and increases the EGR rate that is decreased stepwise as the backflow rate of the EGR gas increases, with the backflow rate of the EGR gas as a compliant element.

After the EGR rate is decreased stepwise, the EGR rate in the EGR convergence portion 11a is gradually decreased by the diluted mixed gas as described above with reference to FIG. 2D. The amount of decrease in the EGR rate at this time changes according to the flow rate of the re-inhaled gas, and is increased as the flow rate of the re-inhaled gas increases. This is because the larger the flow rate of the re-inhaled gas, the faster the diluted mixed gas passes through the EGR convergence portion 11a, and the faster the EGR rate decrease.

Therefore, in the present embodiment, the estimated EGR rate is set by a third profile Prof3 that decreases the EGR rate with passage of time following the second profile Prof2 and decreases the amount of decrease in the EGR rate according to the flow rate of the re-inhaled gas, with the flow rate of the re-inhaled gas as a compliant element.

The third profile Prof3 is a profile that changes the EGR rate with a temporary response delay according to the flow rate of the re-inhaled gas. The amount of decrease in the EGR rate in the third profile Prof3 can be changed by changing a time constant according to the flow rate of the re-inhaled gas.

Figure 4:
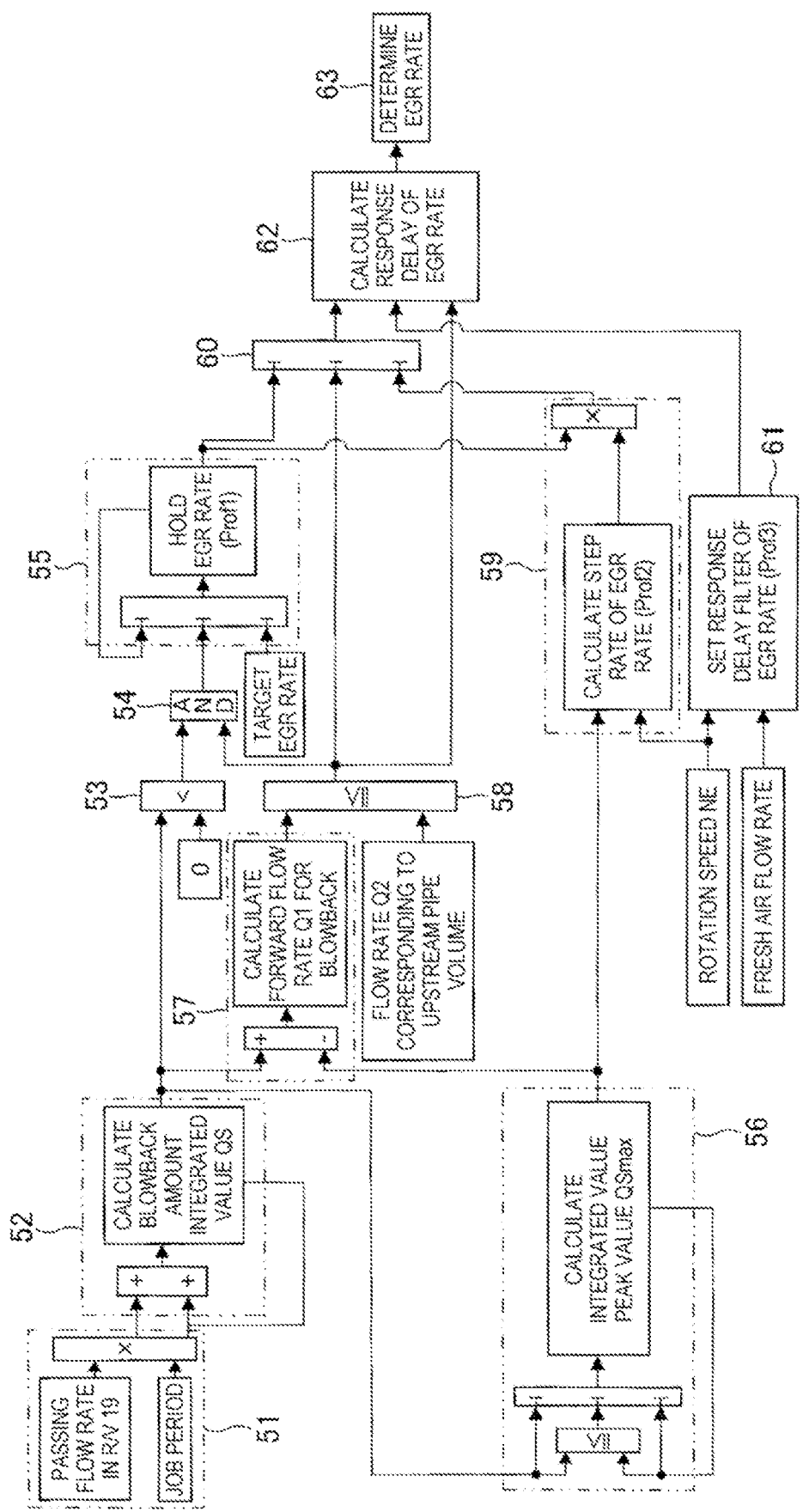
FIG. 4 is a control block diagram showing an EGR rate estimation process.

FIG. 4 is a control block diagram showing an EGR rate estimation process performed by the controller 50. A passing amount calculation unit 51 calculates a passing amount of gas passing through the R/V 19. The passing amount is calculated by multiplying a passing flow rate of the gas passing through the R/V 19 by a JOB period of the estimation process, and is set to a negative value when a blowback occurs. The passing flow rate of the gas passing through the R/V 19 can be calculated based on, for example, a supercharging pressure of the compressor 31, an atmospheric pressure, and a cross-sectional area of the intake bypass passage 18. The calculated passing amount of the gas is input to an integrated value calculation unit 52.

The integrated value calculation unit 52 calculates a blowback amount integrated value QS. The blowback amount integrated value QS is calculated by adding the input passing amount of the gas and the latest calculated blowback amount integrated value QS of the gas. The calculated blowback amount integrated value QS is input to a first determination unit 53, an integrated value peak value calculation unit 56, and a forward flow rate calculation unit 57.

The first determination unit 53 determines whether the input blowback amount integrated value QS is smaller than zero. When the blowback occurs, the blowback amount integrated value QS becomes a negative value, and an affirmative determination is made. In this case, a signal is input from the first determination unit 53 to an AND circuit unit 54.

The AND circuit unit 54 inputs an AND signal to an EGR rate holding unit 55 when a signal is input from each of the first determination unit 53 and a second determination unit 58, which will be described later. The signal from the first determination unit 53 indicates that a blowback occurs, and the signal from the second determination unit 58 indicates that the flow rate Q2 corresponding to the upstream pipe volume is not re-inhaled yet after opening the R/V 19. Therefore, the AND signal indicates that a blowback occurs and the flow rate Q2 corresponding to the upstream pipe volume is not re-inhaled yet.

The EGR rate holding unit 55 sets an EGR rate to be held, that is, sets an EGR rate based on the first profile Prof1. The EGR rate holding unit 55 selects the target EGR rate when no AND signal is input. As a result, the EGR rate is set to the target EGR rate.

When the AND signal is input, the EGR rate holding unit 55 selects the latest set EGR rate and stops the process. As a result, the EGR rate to be held is set. The set EGR rate is input to a step change setting unit 59 and an EGR rate selection unit 60.

The integrated value peak value calculation unit 56 calculates an integrated value peak value QSmax, which is a peak value of the blowback amount integrated value QS. When the input blowback amount integrated value QS is equal to or less than the latest calculated integrated value peak value QSmax (when an absolute value thereof is equal to or more than that of the integrated value peak value QSmax), the integrated value peak value calculation unit 56 selects the input blowback amount integrated value QS. As a result, the selected blowback amount integrated value QS is updated as a new integrated value peak value QSmax, and a provisional integrated value peak value QSmax is calculated.

When the input blowback amount integrated value QS is larger than the latest calculated integrated value peak value QSmax (when an absolute value thereof is smaller than that of the integrated value peak value QSmax), the integrated value peak value calculation unit 56 selects the latest calculated integrated value peak value QSmax and stops the process. As a result, the latest calculated integrated value peak value QSmax is calculated and determined as a true integrated value peak value QSmax in calculation. The true integrated value peak value QSmax is, in other words, the backflow rate of the EGR gas, and indicates a total flow rate of the mixed gas blown back. The calculated integrated value peak value QSmax is input to the forward flow rate calculation unit 57 and the step change setting unit 59.

The forward flow rate calculation unit 57 calculates a forward flow rate Q1 for blowback. The forward flow rate Q1 for blowback is, in other words, the flow rate of the re-inhaled gas, and is calculated based on the integrated value peak value QSmax and the blowback amount integrated value QS. Specifically, the forward flow rate Q1 for blowback is calculated by adding the blowback amount integrated value QS with a positive or negative sign thereof unchanged to the integrated value peak value OSmax with a positive or negative sign thereof reversed. The calculated forward flow rate Q1 for blowback is input to the second determination unit 58.

The second determination unit 58 determines whether the forward flow rate Q1 for blowback is equal to or less than the flow rate Q2 corresponding to the upstream pipe volume. The forward flow rate Q1 for blowback is equal to or less than the flow rate Q2 corresponding to the upstream pipe volume when the flow rate Q2 corresponding to the upstream pipe volume is not re-inhaled since the opening of the R/V 19. In a case of affirmative determination, a signal is input from the second determination unit 58 to the AND circuit unit 54, the EGR rate selection unit 60, and a response delay calculation unit 62.

The step change setting unit 59 calculates a step rate (decrease degree) of the EGR rate based on the integrated value peak value QSmax and the rotation speed NE. The step rate of the EGR rate is calculated to be smaller as the integrated value peak value QSmax is larger, and is calculated to be smaller as the rotation speed NE is smaller. This is because when step change occurs in the EGR rate in the air cleaner 12, the amount of the mixed gas blown back to the air cleaner 12 depends on the backflow rate of the EGR gas and the rotation speed NE of the internal combustion engine 1 that takes in the gas.

The step change setting unit 59 further multiplies the calculated step rate by the EGR rate input from the EGR rate holding unit 55. As a result, a step change is set in the EGR rate, and the EGR rate based on the second profile Prof2 is set. The set EGR rate is input to the EGR rate selection unit 60.

The EGR rate selection unit 60 selects the EGR rate input from the EGR rate holding unit 55 when a signal is input from the second determination unit 58, that is, when the flow rate Q2 corresponding to the upstream pipe volume is not re-inhaled yet since the R/V 19 is opened. Therefore, in this case, the EGR rate based on the first profile Prof1 is selected.

The EGR rate selection unit 60 selects the EGR rate input from the step change setting unit 59 when no signal is input from the second determination unit 58, that is, when the flow rate Q2 corresponding to the upstream pipe volume is re-inhaled, and stops the process. As a result, the EGR rate based on the second profile Prof2 is selected in a form of switching from the EGR rate based on the first profile Prof1. The selected EGR rate is input to the response delay calculation unit 62.

A response delay filter setting unit 61 calculates a time constant of a response delay filter of the EGR rate based on the rotation speed NE and a fresh air flow rate. The fresh air flow rate can be detected based on a signal from the air flow meter 13. Response delay of the EGR rate is set to be smaller as the rotation speed NE is higher and the fresh air flow rate is larger. This is because the higher the rotation speed NE is and the larger the fresh air flow rate is, the larger the flow rate of the re-inhaled gas is, and the diluted mixed gas passes through the EGR convergence portion 11a earlier, so that the EGR rate decreases faster. The calculated time constant of the response delay filter is input to the response delay calculation unit 62.

The response delay calculation unit 62 applies the time constant of the response delay filter input from the response delay filter setting unit 61 to the EGR rate input from the EGR rate selection unit 60 when no signal is input from the second determination unit 58, that is, when the flow rate Q2 corresponding to the upstream pipe volume is re-inhaled. As a result, the response delay of the EGR rate is calculated and reflected in the EGR rate. The EGR rate reflecting the response delay is input to the EGR rate determination unit 63.

When a signal is input from the second determination unit 58, that is, when the flow rate Q2 corresponding to the upstream pipe volume is not re-inhaled yet after the opening of the R/V 19, the response delay calculation unit 62 does not calculate the response delay of the EGR rate. In this case, the EGR rate input from the EGR rate selection unit 60 is directly input to the EGR rate determination unit 63.

The EGR rate determination unit 63 determines the input EGR rate as the EGR rate in the EGR convergence portion 11a. In this way, the EGR rate in the EGR convergence portion 11a when the R/V 19 is opened and the EGR valve 43 is fully closed during the supercharging is estimated according to the first profile Prof1 to the third profile Prof3.

Figure 5:
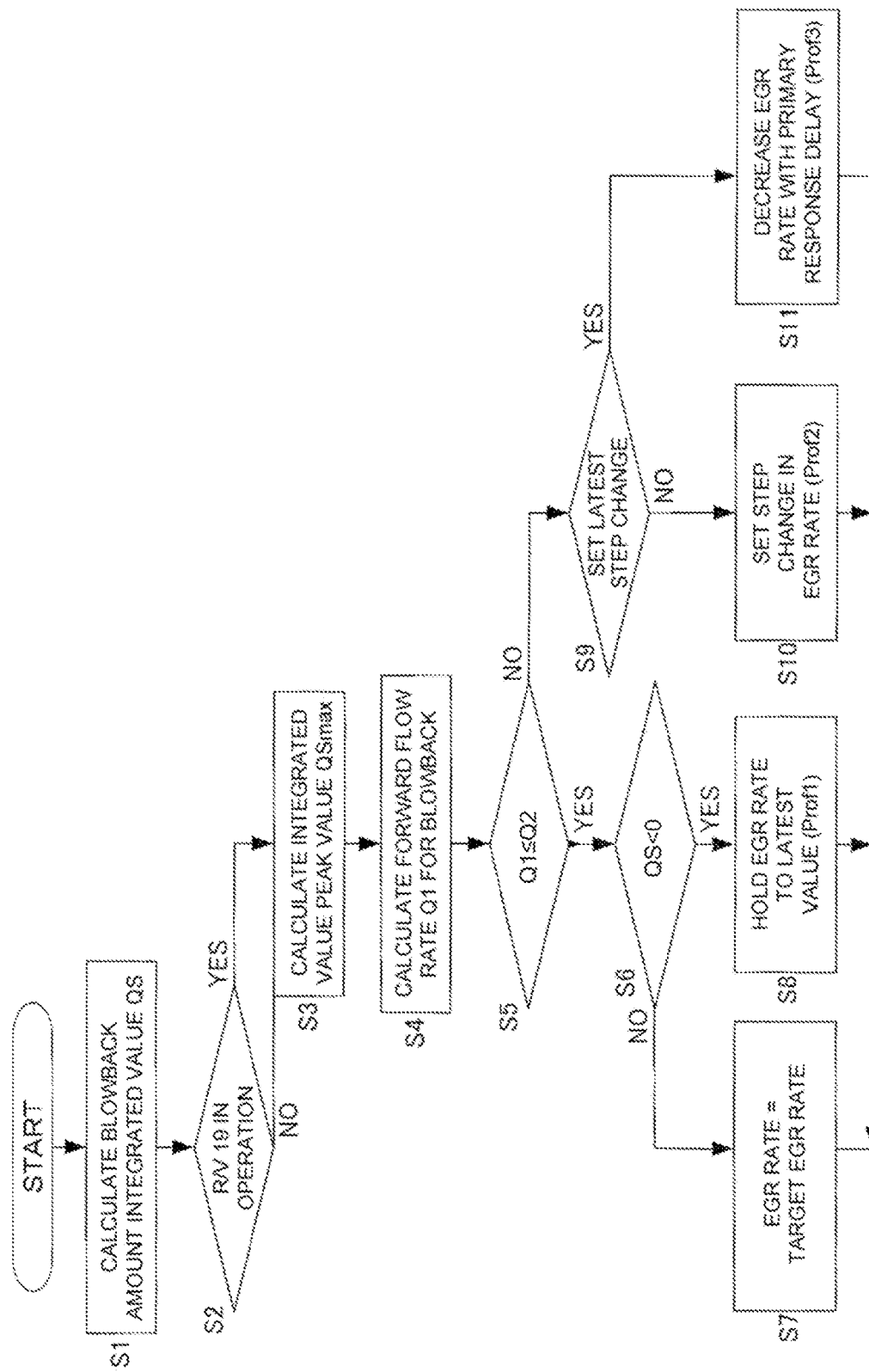
FIG. 5 is a flowchart showing the EGR rate estimation process.

FIG. 5 is a flowchart showing the EGR rate estimation process performed by the controller 50. The controller 50 includes a control unit by being programmed to execute the process shown in this flowchart.

In step S1, the controller 50 calculates the blowback amount integrated value QS. The blowback amount integrated value QS can be calculated as described above with reference to FIG. 4.

In step S2, the controller 50 determines whether the R/V 19 is operating, that is, whether the R/V 19 is opened. If a negative determination is made in step S2, the process proceeds to step S6.

In step S6, the controller 50 determines whether the blowback amount integrated value QS is smaller than zero. In step S6, it is determined that the blowback occurs when the blowback amount integrated value QS is smaller than zero.

When the R/V 19 is closed, no blowback occurs. Therefore, if the process proceeds to step S6 following the negative determination in step S2, a negative determination is made in step S6, and the process proceeds to step S7.

In step S7, the controller 50 sets the EGR rate in the EGR convergence portion 11a as the target EGR rate. In this way, the EGR rate in the EGR convergence portion 11a is set as the target EGR rate before the R/V 19 is opened. After step S7, the process ends temporarily.

If the R/V 19 is opened in a subsequent routine, an affirmative determination is made in step S2, and the process proceeds to step S3.

In step S3 and subsequent step S4, the controller 50 calculates the integrated value peak value QSmax and the forward flow rate Q1 for blowback. The integrated value peak value QSmax and the forward flow rate Q1 for blowback can be calculated as described above with reference to FIG. 4.

In step S5, the controller 50 determines whether the forward flow rate Q1 for blowback is equal to or less than the flow rate Q2 for the upstream pipe volume. If an affirmative determination is made in step S5, it is determined that the flow rate Q2 corresponding to the upstream pipe volume is not re-inhaled yet after the opening of the R/V 19, and the process proceeds to step S6.

When the process proceeds to step S6 following the affirmative determination in step S5, the blowback amount integrated value QS becomes smaller than zero, and an affirmative determination is made in step S6. In this case, the process proceeds to step S8.

In step S8, the controller 50 holds the EGR rate in the EGR convergence portion 11a to the latest value. That is, in step S8, the first profile Prof1 is applied in estimating the EGR rate. After step S8, the process ends temporarily.

In the subsequent routine, affirmative determinations are made in steps S2 and S5 until the R/V 19 is operating and the forward flow rate Q1 for blowback becomes larger than the flow rate Q2 corresponding to the upstream pipe volume, and an affirmative determination is also made in the following step S6. As a result, the EGR rate in the EGR convergence portion 11a remains held at the latest value.

When the R/V 19 is operating and the forward flow rate Q1 for blowback is larger than the flow rate Q2 corresponding to the upstream pipe volume, it is determined that the flow rate Q2 corresponding to the upstream pipe volume is re-inhaled after the R/V 19 is opened, and a negative determination is made in step S5. In this case, the process proceeds to step S9.

In step S9, the controller 50 determines whether a step change is set in the EGR rate in the latest routine. If a negative determination is made in step S9, the process proceeds to step S10.

In step S10, the controller 50 sets a step change in the EGR rate in the EGR convergence portion 11a. That is, in step S10, the second profile Prof2 is applied in estimating the EGR rate. After step S10, the process ends temporarily. In this case, in the next routine after 1 JOB of the routine in which the process of step S10 is performed, an affirmative determination is made in step S9, and the process proceeds to step S11.

In step S11, the controller 50 decreases the EGR rate with a primary response delay. That is, in step S11, the third profile Prof3 is applied in estimating the EGR rate. After step S11, the process of this flowchart ends temporarily.

Next, main functions and effects of the present embodiment will be described.

In the EGR estimation method for the internal combustion engine 1 according to the present embodiment, the EGR rate in the EGR convergence portion 11a in the intake and exhaust system 10, 20 of the internal combustion engine 1 is estimated. The intake and exhaust system 10, 20 of the internal combustion engine 1 includes the intake system 10 including the air cleaner 12 and the intake passage 11, the exhaust system 20 including the exhaust passage 21, and the supercharger 30. The intake and exhaust system 10, 20 is provided with the EGR device 40 including the EGR passage 41 and the EGR valve 43, and the intake system 10 includes the intake bypass passage 18 and the R/V 19. The EGR estimation method for the internal combustion engine 1 estimates the EGR rate in the EGR convergence portion 11a based on the backflow rate of the EGR gas flowing back to the air cleaner 12 side by opening the R/V 19 when opening the R/V 19 and fully closing the EGR valve 43 during the supercharging.

According to such a method, in light of the flow mode of the EGR gas described above with reference to FIGS. 2A to 2D, a more accurate EGR rate can be estimated when the R/V 19 is opened and the EGR valve 43 is fully closed during the supercharging.

In the EGR estimation method for the internal combustion engine 1, even if the R/V 19 is opened and the EGR valve 43 is fully closed, the EGR rate is estimated by using the EGR rate before the EGR valve 43 is fully closed as the EGR rate in the EGR convergence portion 11a, which is an estimated EGR rate, until the predetermined time a elapses. That is, the first profile Prof1 is applied in estimating the EGR rate.

According to such a method, a more accurate EGR rate can be estimated by holding the EGR rate in light of the flow mode of the EGR gas described above with reference to FIGS. 2B and 2C.

In such a method, the predetermined time a is changed according to the backflow rate of the EGR gas.

According to such a method, the EGR rate can be held for an appropriate time, so that a more accurate EGR rate can be estimated.

In the EGR estimation method of the internal combustion engine 1, after the predetermined time a elapses, the EGR rate is estimated based on the EGR rate in the air cleaner 12 when the EGR gas flows back into the air cleaner 12. That is, the second profile Prof2 and the third profile Prof3 are applied in estimating the EGR rate.

According to such a method, in light of the flow mode of the EGR gas described above with reference to FIGS. 2C and 2D, the EGR rate in the EGR convergence portion 11a can be appropriately estimated, so that a more accurate EGR rate can be estimated.

In such a method, the EGR rate estimated based on the EGR rate in the air cleaner 12 is decreased stepwise and increased as the backflow rate of the EGR gas increases. That is, the second profile Prof2 is applied in estimating the EGR rate.

According to such a method, in light of the flow mode of the EGR gas described above with reference to FIG. 2C, the EGR rate is decreased stepwise, and the step rate of the EGR rate when the EGR rate is decreased stepwise is appropriately set, so that a more accurate EGR rate can be estimated.

Further, in such a method, the EGR rate estimated based on the EGR rate in the air cleaner 12 is decreased with the passage of time, and the amount of decrease in the EGR rate is changed according to the flow rate of the re-inhaled gas. That is, the third profile Prof3 is further applied in estimating the EGR rate.

According to such a method, in light of the flow mode of the EGR gas described above with reference to FIG. 2F, the EGR rate when the mixed gas diluted with the air cleaner 12 passes through the EGR convergence portion 11a can be appropriately reflected, so that a more accurate EGR rate can be estimated.

Although the embodiment of the present invention has been described above, the above-mentioned embodiment is merely a part of application examples of the present invention, and does not mean that the technical scope of the present invention is limited to the specific configurations of the above-mentioned embodiment.

For example, in the above embodiment, the case of estimating the EGR rate in the EGR convergence portion 11a is described. However, the estimated EGR rate may be an EGR rate at a predetermined position from a portion of the intake passage 11 downstream of the EGR convergence portion 11a to the internal combustion engine 1, such as the EGR rate of the gas flowing into the cylinder of the internal combustion engine 1. Such an EGR rate can be estimated by, for example, correcting a timing at which the step change of the EGR rate is achieved according to a distance from the EGR convergence portion 11a and the like.

The estimated EGR rate may be, for example, an EGR rate at a predetermined position of a portion of the intake passage 11 upstream of the EGR convergence portion 11a. Such an EGR rate can be estimated by, for example, correcting a timing at which the mixed gas filled in the intake passage 11 arrives immediately before the R/V 19 is opened, according to a distance from the EGR convergence portion 11a and the like. Such a case is also included in estimating the EGR rate in the EGR convergence portion 11a based on the backflow rate of the EGR gas flowing back to the air cleaner 12 side by opening the R/V 19 when opening the R/V 19 and fully closing the EGR valve 43 during the supercharging. Therefore, the estimated EGR rate can be the EGR rate at a predetermined position from the intake passage 11 to the internal combustion engine 1.

The invention claimed is:

1. An EGR estimation method for estimating an EGR rate in an intake and exhaust system of an internal combustion engine, the intake and exhaust system of an internal combustion engine including: an intake system including an air cleaner and an intake passage that connects the air cleaner and an internal combustion engine, an exhaust system including an exhaust passage that is connected to the internal combustion engine, and a supercharger that is provided in the intake passage and the exhaust passage, the intake and exhaust system being provided with an EGR device including an EGR passage that connects the intake passage and the exhaust passage and an EGR valve that is provided in the EGR passage, and the intake system including an intake bypass passage that connects an upstream pressure portion and a downstream pressure portion of the supercharger in the intake system and a recirculation valve that is provided in the intake bypass passage, the EGR estimation method comprising:

opening the recirculation valve during supercharging, and estimating the EGR rate after fully closing the EGR valve based on the EGR rate before opening the recirculation valve.

2. The EGR estimation method for an internal combustion engine according to claim 1, wherein even when the recirculation valve is opened and the EGR valve is fully closed, the EGR rate is estimated using an EGR rate before the EGR valve is fully closed as the estimated EGR rate until a predetermined time elapses.

3. The EGR estimation method for an internal combustion engine according to claim 2, wherein the predetermined time changes according to a backflow rate of the EGR gas.

4. The EGR estimation method for an internal combustion engine according to claim 2, wherein after the predetermined time elapses, the EGR rate is estimated based on an EGR rate in the air cleaner when the EGR gas flows back into the air cleaner.

5. The EGR estimation method for an internal combustion engine according to claim 4, wherein the EGR rate estimated based on the EGR rate in the air cleaner decreases stepwise and increases as the backflow rate of the EGR gas increases.

6. The EGR estimation method for an internal combustion engine according to claim 5, wherein the EGR rate estimated based on the EGR rate in the air cleaner decreases with passage of time, and an amount of decrease in the EGR rate changes according to a flow rate of re-inhaled gas.

7. An EGR estimation device for estimating an EGR rate in an intake and exhaust system of an internal combustion engine, the intake and exhaust system of an internal combustion engine including: an intake system including an air cleaner and an intake passage that connects the air cleaner and an internal combustion engine, an exhaust system including an exhaust passage that is connected to the internal combustion engine, and a supercharger that is provided in the intake passage and the exhaust passage, the intake and exhaust system being provided with an EGR device including an EGR passage that connects the intake passage and the exhaust passage and an EGR valve that is provided in the EGR passage, and the intake system including an intake bypass passage that connects an upstream pressure portion and a downstream pressure portion of the supercharger in the intake system and a recirculation valve that is provided in the intake bypass passage, the EGR estimation device comprising:

a control unit that opens the recirculation valve during supercharging, and estimates the EGR rate after fully closing the EGR valve based on the EGR rate before opening the recirculation valve.

* * * * *